United States Patent
Rohde et al.

(12)

(10) Patent No.: US 6,462,135 B1
(45) Date of Patent: Oct. 8, 2002

(54) LOW-ODOR POLYETHYLENE BLENDS

(75) Inventors: Wolfgang Rohde, Speyer; Peter Bauer, Ludwigshafen; Dieter Lilge, Limburgerhof; Martin Lux, Dannstadt-Schauernheim; Paulus de Lange, Limburgerhof; Guido Funk, Worms, all of (DE)

(73) Assignee: Basell Polyolefine GmbH, Bruehl (DE)

( * ) Notice: Subject to any disclaimer, the term of this patent is extended or adjusted under 35 U.S.C. 154(b) by 0 days.

(21) Appl. No.: 09/743,923

(22) PCT Filed: Jul. 14, 1999

(86) PCT No.: PCT/EP99/04969

§ 371 (c)(1),
(2), (4) Date: Jan. 7, 2001

(87) PCT Pub. No.: WO00/06646

PCT Pub. Date: Feb. 10, 2000

(30) Foreign Application Priority Data

Jul. 28, 1998 (DE) .......................................... 198 33 858

(51) Int. Cl.⁷ .................. C08L 23/00; C08L 23/04; B29D 22/00; C08J 5/00
(52) U.S. Cl. ...................... 525/191; 525/240; 428/35.7; 428/500; 264/331.11
(58) Field of Search ................................ 525/191, 240; 428/35.7, 500; 264/331.11

(56) References Cited

U.S. PATENT DOCUMENTS

| 4,015,059 | A | 3/1977 | Karol |
|---|---|---|---|
| 4,347,158 | A | 8/1982 | Kaus et al. |
| 4,424,139 | A | 1/1984 | McDaniel |
| 4,845,176 | A | 7/1989 | Konrad |
| 5,350,807 | A | 9/1994 | Pettijohn |

FOREIGN PATENT DOCUMENTS

| DE | 34 33 468 | 3/1986 |
|---|---|---|
| EP | 100 843 | 2/1984 |
| EP | 533 154 | 3/1993 |
| EP | 533 155 | 3/1993 |
| EP | 533 156 | 3/1993 |
| EP | 533 160 | 3/1993 |
| WO | 95/01999 | 1/1995 |

*Primary Examiner*—Nathan M. Nutter
(74) *Attorney, Agent, or Firm*—Keil & Weinkauf

(57) ABSTRACT

In a low-odor polyethylene blend made from a high-molecular-weight ethylene copolymer obtainable by polymerization in the presence of a Ziegler catalyst and from a low-molecular-weight ethylene homopolymer or ethylene copolymer obtainable by polymerization in the presence of a chromocene catalyst on an oxidic support, the Al content of the high-molecular-weight component is from 5 to 60 mg/kg, the Al content of the low-molecular-weight component is from 0 to 5 mg/kg and the Al content of the blend is from 1 to 55 mg/kg. Processes are described for preparing blends of this type. Their use is described for producing moldings, in particular hollow articles and pipes. Moldings, in particular hollow articles and pipes, are produced from low-odor polyethylene blends.

11 Claims, No Drawings

LOW-ODOR POLYETHYLENE BLENDS

The present invention relates to low-odor polyethylene blends comprising (a) from 30 to 90% by weight of a high-molecular-weight ethylene copolymer with a melt flow rate MFR 190/21.6 $\leq$ 1.5 g/10 min, a density $\leq$ 0.950 g/cm$^3$, a weight-average molecular weight $M_w \leq$ 300,000 g/mol and a polydispersity Mw/Mn of from 1 to 10, and (b) from 10 to 70% by weight of a low-molecular-weight ethylene homopolymer or ethylene copolymer with a melt flow rate MFR 190/2.16 of from 20 to 100 g/10 min, a density $\leq$ 0.95 g/cm$^3$, a weight-average molecular weight $M_w$ of from 8000 to 80,000 g/mol and a polydispersity $M_w/M_n$ of from 2.5 to 12, where the Al content of the high-molecular-weight component is from 5 to 60 ppm, the Al content of the low-molecular-weight component is from 0 to 5 ppm and the Al content of the blend is from 1 to 55 ppm. It further relates to a process for preparing polyethylene blends of this type, and also to their use for producing moldings, in particular hollow articles and pressure pipes.

Ever higher requirements are being placed upon the mechanical load-bearing capacity of moldings made from polyethylene. In particular, there is a requirement for highly stress-cracking resistant, impact-resistant and stiff products which are particularly suitable for the production of hollow articles, and also of pressure pipes. The requirement for good stress-cracking resistance at the same time as stiffness is not easy to fulfil, since these properties counteract one another. Whereas stiffness increases with the density of the polyethylene, stress-cracking resistance decreases with increasing density.

For hollow articles and pressure pipes it has therefore proven to be advantageous to use blends made from a high-molecular-weight, low-density ethylene copolymer and from a low-molecular-weight, high-density ethylene homopolymer. These are described, for example, by L. L. Böhm et al., Adv. Mater. 4, (1992) 234–238. Similar polyethylene blends have been disclosed in EP-A 100 843, EP-A 533 154, EP-A 533 155, EP-A 533 156, EP-A 533 160 and U.S. Pat. No. 5,380,807.

Pressure pipes made from polyethylene are used increasingly for conveying drinking water. For this application, besides high stiffness and high creep rupture strength at high pressures it is important that the polyethylene has very low odor and is very taste-neutral. The odor level of a material may be determined by various methods. A necessary, but not sufficient, criterion for a good odor level is a very low proportion of volatile carbon compounds in the material. For example, the test known as the VW Audi test (test specification 3341, Verband Deutscher Automobilbauer, Recommended Standard No. 277), determines volatile carbon fractions of a material at 120° C. However, it is also essential to assess odor. According to DIN 10955 and 10951 Al or EN 1622 a number of test personnel assess the odor of a material on a scale from 0 to 4. The "electronic nose" records volatile constituents of the material by means of various conductivity measurements.

Polymeric Materials Encyclopedia, Ed. J. P. Salamone, CRC Press, New York, 1996, pages 5997–98 lists possible causes for odor in polyethylene. The odor of polyethylene is generally caused by oxidation of the polymer or by catalyst residues, e.g. the triethylaluminum used as cocatalyst in Ziegler catalysts. Other possible causes are additives, e.g. Ca stearate or Zn stearate, and especially decomposition products of these. These additives are used, for example, to bind HCl deriving from Ziegler catalysts. For drinking water applications it is therefore frequently necessary to add odor-trapping additives to the polyethylene or to carry out additional steps, such as deodorization via aeration.

Low-molecular-weight components are a particular problem in the preparation of low-odor polyethylene blends, since their molecular weight should be very low to ensure sufficiently high density/stiffness in the blend. If, however, the low-molecular-weight component has a broad molecular weight distribution there is the risk that the blend will comprise too many oligomers which could cause odor. U.S. Pat. No. 5,350,807 has therefore disclosed polyethylene where a degree of polymerization of only 9 to 125 is a preferred range for the low-molecular-weight fraction. In addition, impact strength of the blend is adversely affected by too high a proportion of oligomers. The molecular weight distribution of the low-molecular-weight component should therefore be very narrow.

Narrow molecular weight distributions are preferably achieved with the traditional Ziegler catalysts and metallocene catalysts. However, these require large amounts of free organic Al cocatalysts, which adversely affect the odor of the polyethylene. The free cocatalysts may moreover form ethylene oligomers via the molecular-weight-increase reaction described by Ziegler, and these increase the proportion of volatile compounds in the polymer. In addition, Ziegler catalysts have only low productivity in the preparation of low-molecular-weight polyethylene, and therefore a large amount of catalyst is required, and therefore also a large amount of cocatalyst. Phillips catalysts give only broad molecular weight distributions and likewise require large amounts of cocatalysts in order to achieve low molecular weights. The problem of preparing low-odor, low-molecular-weight polyethylene components for ethylene polymer blends with high-productivity catalysts has not yet been solved.

None of the abovementioned disclosures encompasses ethylene polymer blends which have, besides good mechanical properties, a low odor level and low intrinsic taste.

It is an object of the present invention to provide improved blends of this type.

We have found that this object is achieved by means of the blends defined at the outset. A process for preparing blends of this type has also been found, as has their use for hollow articles and pipes.

The polyethylene blend of the present invention comprises two components.

The low-molecular-weight component (b) is composed of an ethylene homopolymer or ethylene copolymer with a weight-average molecular weight of from 8,000 to 80,000 g/mol, preferably from 20,000 to 70,000 g/mol and particularly preferably from 30,000 to 60,000 g/mol. The polydispersity $M_w/M_n$ is from 2.5 to 12, preferably from 3 to 10 and particularly preferably from 5 to 8. The melt flow rate MFR 190/2.16 of the ethylene homopolymer or ethylene copolymer is from 15 to 100 g/10 min, preferably from 20 to 60 g/min and particularly preferably from 25 to 40 g/10 min. The density is at least 0.95 g/cm$^3$, preferably from 0.95 to 0.97 g/cm$^3$, particularly preferably from 0.96 to 0.97 g/cm$^3$.

Besides ethylene, the low-molecular-weight component may also comprise comonomers. The comonomer is selected taking account of the properties desired. However, comonomers preferably used are 1-olefins, particularly preferably propene, 1-butene, 1-pentene, 1-hexene, 1-octene or 4-methylpentene. The amount of the comonomer used is likewise selected taking into account the properties desired, but the amount is preferably not more than 1 mol %, based on the amount of all the monomers used.

The low-molecular-weight polyethylene component of the present invention has only small fractions of volatile carbon compounds. The proportion of volatile carbon, measured at 120° C. by the abovementioned VW-Audi test is not more than 80 mg/kg, preferably not more than 70 mg/kg.

The low-molecular-weight component preferably comprises no aluminum. However, the present invention also encompasses components which comprise traces of Al. Traces of this type may result, for example, from preparation, transport or storage in vessels comprising Al. The Al content of the low-molecular-weight component is, however, never greater than 5 mg/kg, based on polyethylene.

The high-molecular component (a) is composed of an ethylene copolymer with a weight average molecular weight $\geq 300,000$ g/mol, preferably from 350,000 to 700,000 g/mol and particularly preferably from 400,000 to 600,000 g/mol. The comonomer used besides ethylene is selected taking into account the properties desired. However, the comonomers used are preferably 1-olefins, particularly preferably propene, 1-butene, 1-pentene, 1-hexene, 1-octene or 4-methylpentene. The amount of the comonomer used is also selected taking into account the properties desired, but preference is given to amounts of from 0.2 to 4.0 mol % based on the amount of all the monomers used.

The polydispersity $M_w/M_n$ is from 1 to 10, preferably from 3 to 9 and particularly preferably from 5 to 9. The melt flow rate MFR 190/21.6 of the ethylene copolymer is not greater than 1.5 g/10 min, preferably from 0.5 to 1.5 g/10 min and particularly preferably from 0.6 to 1.2 g/10 min. If the melt flow index MFR 190/21.6 is greater than 1.5 g/10 min the mechanical properties of the blend are impaired. The density is not greater than 0.950 g/cm$^3$, preferably from 0.91 to 0.945 g/cm$^3$, particularly preferably from 0.92 to 0.94 g/cm$^3$.

The high-molecular-weight polyethylene components of the present invention have only small fractions of volatile carbon compounds. The proportion of volatile carbon, measured at 120° C. using the abovementioned VW Audi test is less than 80 mg/kg, preferably less than 40 mg/kg.

The high-molecular-weight polyethylene component of the present invention comprises from 5 to 60 mg/kg of Al, based on polyethylene, particularly preferably from 20 to 50 mg/kg.

The novel blends comprise from 30 to 90% by weight of the high-molecular-weight component and from 10 to 70% by weight of the low-molecular-weight component. They preferably comprise from 40 to 80% by weight of the high-molecular-weight component and from 20 to 60% by weight of the low-molecular-weight component, particularly preferably from 40 to 60% by weight of the high-molecular-weight component and from 60 to 40% by weight of the low-molecular-weight component.

The novel blends comprise not more than 55 mg/kg of Al. If the Al content is greater the polyethylene blends obtained no longer have low odor. The Al content is preferably from 1.5 to 55 mg/kg and particularly preferably from 5 to 30 mg/kg.

The novel blends furthermore have low odor. The odor class determined according to DIN 10955 and 10951 Al or EN 1622 is below 3. The proportion of volatile carbon, measured at 120° C. using the abovementioned VW Audi test is not more than 80 mg/kg, preferably not more than 60 mg/kg, particularly preferably not more than 30 mg/kg.

The novel blends may be prepared in a manner known per se from the high- and the low-molecular-weight component by intimate mixing and homogenizing at elevated temperatures, e.g. in single- or twin-screw extruders or kneaders. During the mixing and homogenization procedure the exposure of the polymer to temperature is held very low so that very little additional volatile carbon fraction is produced by decomposition. The temperature is therefore kept very low and the mixing time very short. The temperature is preferably from 180 to 270° C. It is also possible to add other components during the mixing and homogenization procedure, for example processing aids, color pigments, dyes, UV stabilizers or antioxidants known per se. The amount of the additives is adjusted in such a way that the proportion of volatile carbon in the blend does not exceed 80 mg/kg and that the odor class obtained is below 3.

The high-molecular-weight ethylene copolymers described with low proportions of volatile carbon are prepared using Ziegler catalysts known per se. Titanium catalysts are particularly preferred. Catalysts of this type, and also the processes for preparing polymers of this type, are described, for example, in DE-A 34 33 468, DE-A 42 17 171 and EP-A 518093, but this selection is not intended to limit the invention. The amount of cocatalysts is restricted in such a way that the proportion of volatile carbon does not exceed 80 mg/kg and that the Al content is not more than 60 mg/kg. The polymerization is usually carried out in suspension, e.g. in a loop reactor, or in the gas phase, e.g. in a fluidized-bed reactor.

The low-molecular-weight ethylene homopolymers or ethylene copolymers described with low proportions of volatile carbon are prepared using a chromocene catalyst on an oxidic support. Chromocene catalysts for preparing polyolefins are known in principle, for example from DE-A 43 23 192 or U.S. Pat. No. 4,424,139. For the purposes of this invention bis(cyclopentadienyl)chromium(II) is particularly suitable.

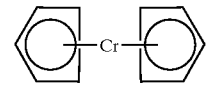

However, the invention also encompasses chromocene derivatives in which the cyclopentadienyl groups carry inert organic substituents. Examples of possible substituents are alkyl, such as $C_1$–$C_6$-alkyl, and/or $C_6$–$C_{12}$-aryl. Annelated cyclopentadienyl groups, such as indene or fluorene, which may likewise have substitution by the radicals mentioned, are also possible.

Suitable support materials are metal oxides, e.g. the oxides of silicon or of zirconium, silica being preferred. The preparation of supports of this type has been described, for example, in DE-A 36 34 534. These supports preferably have high internal surface of from about 50 to 1000 m$^2$/g. The average pore diameter is in the range from 1 to 100 nm. An example of a particularly preferred commercially available product is Silicia Gel 332 from Grace. Contrasting with this, the use, for example, of the chromocene catalyst disclosed by U.S. Pat. No. 4,424,139 on an AlPO$_4$ support gives low-molecular-weight components which have a marked odor and high proportions of volatile carbon. Chromocene catalysts supported in this way also have lower productivity.

Before loading with the chromocene, the support materials are usually baked in an inert gas atmosphere at from 200 to 900° C. to remove adsorbed water.

The loading of the dried support material is preferably carried out by dissolving the chromocene in a solvent and exposing the support material to the solvent for several hours. Suitable solvents are hydrocarbons, such as n-pentane, n-hexane, cyclohexane or toluene. The amount of solvent is selected in such a way that the support material is completely wetted. The solids are then separated off from the solvent, e.g. by filtration, and the solid is dried.

The amount of chromium in the supported catalyst is generally from 0.1 to 10% by weight, based on the support material.

The polymerization is generally carried out in suspension, e.g. in a loop reactor, or in the gas phase, e.g. in a fluidized-bed reactor, in a manner known per se, for example as described in Ullmanns Enzyklopddie der technischen Chemie, Vol. 19, 4th edition.

Cocatalyts may also be used in addition to chromocene. Cocatalysts which are excluded are aluminum compounds and boron compounds. However, hydrides or organometallic compounds of alkali metals or of alkaline earth metals may be added as cocatalysts if required. Possible metals, besides lithium, are sodium, potassium, beryllium, magnesium, calcium or barium. Preferred organometallic compounds are metal alkyl compounds and metal aryl compounds. Possible hydrocarbon radicals are aliphatic radicals having from 1 to 6 carbon atoms, and also aromatic radicals having from 6 to 15 carbon atoms. Preference is given here to the lithium compounds, e.g. n-butyllithium or phenyllithium. The amount may be selected taking into account the requirements, but is restricted in such a way that the proportion of volatile carbon in the low-molecular-weight components prepared does not exceed 80 mg/kg.

The novel polyethylene blends have low odor and low intrinsic taste. They also have high stress-cracking resistance and high impact strength. They are therefore highly suitable for the production of films and moldings, in particular of pressure pipes for conveying drinking water, and also for hollow articles for the storage and transport of drinks and foods.

The following working examples serve to describe the invention further but are not intended to limit its scope.

The measurements described were determined in the following way:

| | |
|---|---|
| Density | in accordance with ISO 1183 |
| Melt flow index MFR 190/21.6 or MFR 190/2.16 | in accordance with ISO 1133 |
| Weight-average molecular weight $M_w$, Molecular weight distribution $M_w/M_n$ | based on DIN 55672 with polyethylene standards |
| Stress-cracking resistance ESCR | disk-shaped test specimens (diameter 40 mm, thickness 2 mm, molded from one side with a notch of length 20 mm and depth 0.1 mm) are immersed at 80° C. in a 1% strength Nekanil solution and subjected to a pressure of 3 bar. The time to appearance of stress cracks is measured. |
| Volatile carbon: | measured using the VW Audi test, Test Specification 3341, Verband Deutscher Automobilbauer, Recommended Standard No. 277 |
| Odor class | based on DIN 10955 and 10951 A1 or EN 1622 Sample preparation: 30 g of product are baked in a 1 l wide-necked glass vessel at 40° C. for 2 h for each test by a tester. Test At least 7 testers are used for each product. Assessment is by class: 0 no detectable odor 1 hardly any detectable odor 2 weak odor 3 marked odor 4 strong odor Half-class differences are permissible, and the odor class for each product is calculated as an average over all of the testers. |
| Odor assessment by electronic nose | Device: FOX 3000 Electronic Nose from Alpha M.O.S. (Toulouse) Specimens are baked for 1 h at 120° C. in a closed vessel. 2.5 ml of gas is then taken from the gas space above the specimen and injected into the test apparatus. The constituents of the gas bring about changes in conductivity at 16 different sensors and these are measured over time. A high total conductivity can be correlated with high odor. The total conductivity (in units relative to the zero point of the device) is given, measured 40 s after injection |

Preparation of the High-molecular-weight Component:

EXAMPLE 1

(According to the Invention)

The high-molecular-weight ethylene copolymer was prepared in a 180 l loop reactor using a Ziegler catalyst (commercially available catalyst Sylopol 5950, Grace). A pressure of 41 bar was maintained in the reactor. The cocatalyst used was truisobutylaluminum in a concentration of 250 ppm, based on the polyethylene. The comonomer t used was 1-hexene. The internal reactor temperature was 95° C. Process and product data are given in Table 1.

Preparation of the Low-molecular-weight Component:

EXAMPLE 2

(According to the Invention)

The low-molecular-weight ethylene homopolymer was prepared in a 180 l loop reactor in accordance with DE-A 43 23 192, Example 1, using a chromocene catalyst. The su pport used was pure silica gel calcined at 800° C. The cocatalyst used was n-butyllithium in a concentration of 8 ppm based on the polymer. The internal reactor temperature was 95° C. Product and process data are given in Table 1.

EXAMPLE 3

(For Comparison)

The low-molecular-weight ethylene homopolymer was prepared in a 180 l loop reactor using a Ziegler catalyst (Sylopol 5950, Grace). The cocatalyst used was triisobutylaluminum in a concentration of 185 ppm, based on the polyethylene. The comonomer used was 1-hexene. The internal reactor temperature was 100° C. Process and product data are given in Table 1.

EXAMPLE 4

(According to the Invention)

Silica (SG 332, Grace-Davison) was calcined in the fluidized-bed reactor for 6 h under argon at 800° C. After cooling, 15.6 g of the calcined silica gel were suspended in 150 ml of heptane under Ar, 1.11 g of chromocene was added (corresponding to 2% by weight of Cr) and the mixture was stirred for 2 h at room temperature. The solid was then filtered off, washed with heptane and dried in vacuo at room temperature.

The polymerization was carried out with 177 mg of the catalyst in a 1 l autoclave. The suspension medium used was 0.5 l of isobutane, precharged together with 0.2% by volume of hydrogen and 20 mg of butyllithium. The experiment was carried out at 80° C. and a total pressure of 26 bar. After 90 min the experiment was terminated by releasing the reactor pressure. The results are given in Table 2.

EXAMPLE 5

(Comparative Example in Accordance with U.S. 4,424,139, Example 3)

468.9 g of $Al(NO_3)_3 \cdot 9\ H_2O$ and 115.0 g of $(NH_4)H_2PO_4$ (P/Al=0.8) were heated under inert gas to 80–90° C. and the resulting melt mixed intimately. After 1 h the pH was adjusted to 6–7 by adding 35% strength ammonia solution. The product was filtered off and washed, then dried to constant weight.

The resultant $AlPO_4$ was calcined in the fluidized-bed reactor for 6 h under argon at 600° C.

After cooling, 11.3 g of the calcined $AlPO_4$ were suspended in 150 ml of heptane under Ar. 0.86 g of chromocene was added (corresponding to 2% by weight of Cr) and the mixture was stirred for 2 h at room temperature. The solid was then filtered off, washed with heptane and dried in vacuo at room temperature.

The polymerization was carried out with 198 mg of the catalyst in a 1 l autoclave. The suspension medium used was 0.5 l of isobutane, precharged together with 0.6% by volume of hydrogen and 37.2 mg of triethylborane (B/Cr=5). The experiment was carried out at 96° C. and a total pressure of 40 bar. After 90 min the experiment was terminated by releasing the reactor pressure. The results are given in Table 2.

Preparation of the Blend:

EXAMPLES 6 and 7

A ZSK 25 twin-screw extruder from Werner & Pfleiderer was used to prepare the blends. Extrusion took place at 210° C. at a rotation rate of 300 rpm and a throughput of 13 kg/h. Each of the blends was stabilized with 1000 ppm of Irganox® 1076 and 2000 ppm of Irganox B 215 (Ciba-Geigy). The results are given in Table 3.

TABLE 1

High- and low-molecular-weight components prepared in the loop reactor using Ziegler catalysts or chromocene catalysts

| Experiment number | Remarks | Concentration in suspension medium [mol %] Ethene | Concentration in suspension medium [mol %] Hexene | Concentration in suspension medium [mol %] $H_2$ | Melt flow rate MFR 190/2.16 [g/10 min] | Density [g/cm³] | % by weight of hexene in polymer | $M_w$ [g/mol] | $M_w/M_n$ | Al-content [mg/kg] | Volatile carbon in polymer [mg/kg] | Odor class | Total electronic nose conductivity [rel. units] | Productivity [g of PE/g of cat.] |
|---|---|---|---|---|---|---|---|---|---|---|---|---|---|---|
| 1 | High-molecular-weight component (Ziegler) | 9.9 | 6.1 | 0.04 | 0.8 (190/21.6) | 0.924 | 4.4 | 537000 | 6.8 | 27 | 24 | 2.8 | 1.49 | 8500 |
| 2 | Low-molecular-weight component (chromocene) | 19.4 | — | 0.22 | 30 | 0.967 | — | 57000 | 6.5 | <3 | 60 | 2.5 | 1.1 | 12000 |
| C3 | Low-molecular-weight component (Ziegler) | 5.9 | — | 1.20 | 31.2 | 0.969 | — | 71000 | 10.8 | 20 | 87 | 3.4 | 1.61 | 2000 |

C = comparative experiment

TABLE 2

Low-molecular-weight components (b) using supported chromocene catalysts

| Experiment number | Remarks | Productivity [g of PE/g of cat.] | Melt flow rate MFR 190/2.16 [g/10 min] | Density [g/cm³] | $M_w$ [g/mol] | $M_w/M_n$ | Al content [mg/kg] | Proportion of volatile carbon in polymer [mg/kg] | Odor class | Total electronic nose conductivity [rel. units] |
|---|---|---|---|---|---|---|---|---|---|---|
| 4 | Low-molecular-weight component with $SiO_2$ support (chromocene) | 1723 | 18.8 | 0.963 | 63000 | 7 | <3 | 62 | 2.8 | 1.61 |
| C5 | Low-molecular weight component with $AlPO_4$ support (chromocene) | 303 | 23.9 | 0.963 | 61000 | 8 | 705 | 114 | 4 | 2.66 |

TABLE 3

Polyethylene blends

| Experiment number | High-molecular-weight component Ex. No. | High-molecular-weight component % by weight | Low-molecular-weight component Ex. No. | Low-molecular-weight component % by weight | Melt flow rate MFR 190/21.6 [g/10 min] | Density [g/cm³] | Al proportion [mg/kg] | Proportion of volatile carbon in polymer [mg/kg] | Odor class | Total electronic nose conductivity [rel. units] | Stress-cracking resistance ESCR [h] |
|---|---|---|---|---|---|---|---|---|---|---|---|
| 6 | 1 (Ziegler) | 50 | 2 (chromocene) | 50 | 11.4 | 0.947 | 15 | 21 | 2.6 | 0.79 | >200 |
| C7 | 1 (Ziegler) | 50 | C3 (Ziegler) | 50 | 11.6 | 0.947 | 24 | 33 | 3.5 | 1.00 | >200 |

The examples show that, compared with the prior art blends, the novel blends have excellent odor properties.

Compared with those prepared with Ziegler catalysts, low-molecular-weight components prepared according to the invention have markedly lower proportions of volatile carbon, a better odor class and a lower total conductivity, measured with the electronic nose. Table 2 shows the advantages of oxidic supports compared with $AlPO_4$ supports. Oxidic supports give better odor properties and also have considerably higher productivity. Table 3 shows that blends prepared with the low-molecular-weight components according to the invention with the same high-molecular-weight component have lower proportions of volatile carbon, a better odor class and a lower total conductivity, measured with the electronic nose. They therefore have better suitability for applications with food and drink.

We claim:

1. A low-odor polyethylene blend comprising
   (a) from 30 to 90% by weight of a high-molecular-weight ethylene copolymer with a melt flow rate MFR 190/21.6≦1.5 g/10 min, a density ≦0.950 g/cm³, a weight-average molecular weight $M_w$≧300,000 g/mol and a polydispersity $M_w/M_n$ of from 1 to 10, obtainable by polymerization in the presence of a Ziegler catalyst and
   (b) from 10 to 70% by weight of a low-molecular-weight ethylene homopolymer or ethylene copolymer with a melt flow rate MFR 190/2.16 of from 20 to 100 g/10 min, a density ≧0.95 g/cm³, a weight-average molecular weight $M_w$ of from 8000 to 80,000 g/mol and a polydispersity $M_w/M_n$ of from 2.5 to 12, obtainable by polymerization in the presence of a chromocene catalyst on a metal oxide support,
   where the Al content of the high-molecular-weight component is from 5 to 60 ppm, the Al content of the low-molecular-weight component is from 0 to 5 ppm and the Al content of the blend is from 1 to 55 ppm.

2. A low-odor polyethylene blend as claimed in claim 1, wherein the high-molecular-weight ethylene copolymer comprises a comonomer proportion of from 0.2 to 4.0 mol % and the low-molecular-weight ethylene homopolymer or ethylene copolymer has a comonomer proportion of from 0 to 1 mol %, based in each case on the total amount of all of the monomers used.

3. A low-odor polyethylene blend as claimed in claim 2, wherein the comonomer is at least one comonomer selected from the class consisting of propene, 1-butene, 1-pentene, 1-hexene, 1-octene and 4-methylpentene.

4. A low-odor polyethylene blend as claimed in claim 1, wherein the high-molecular-weight ethylene copolymer (a) is prepared by polymerization with a Ziegler catalyst in suspension or in the gas phase.

5. A low-odor polyethylene blend as claimed in claim 1, wherein the low-molecular-weight ethylene homopolymer or ethylene copolymer (b) is prepared by polymerization with a chromocene catalyst or with a substituted chromocene catalyst on a metal oxide in suspension or in the gas phase.

6. A low-odor polyethylene blend as claimed in claim 5, wherein the metal oxide is silica gel.

7. A process for preparing a low-odor polyethylene blend as claimed in claim 1, which comprises mixing with one another, and homogenizing, a high-molecular-weight ethylene copolymer (a), prepared by polymerization with a Ziegler catalyst in suspension or in the gas phase, and a low-molecular-weight ethylene homopolymer or ethylene copolymer (b), prepared by polymerization with a chromocene catalyst or with a substituted chromocene catalyst on a metal oxide support in suspension or in the gas phase.

8. In an method of preparing films or moldings comprising the step of mixing polymers at elevated temperatures in an extruder or kneader, the improvement comprising using the low-odor polyethylene blend as claimed in claim 1.

9. A film or a molding produced from low-odor polyethylene as claimed in claim 1.

10. The method of claim 8 wherein the molding is a hollow article or pressure pipe.

11. A molding as claimed in claim 9 in the form of a hollow article or pressure pipe.

* * * * *